(12) United States Patent
Haubold et al.

(10) Patent No.: US 8,893,116 B2
(45) Date of Patent: Nov. 18, 2014

(54) INSTALLATION ENGINE AND PACKAGE FORMAT FOR PARALLELIZABLE, RELIABLE INSTALLATIONS

(75) Inventors: Jeremy Haubold, Portage, IN (US); Claudio Pacciarini, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 59 days.

(21) Appl. No.: 13/350,810

(22) Filed: Jan. 15, 2012

(65) Prior Publication Data
US 2013/0185709 A1    Jul. 18, 2013

(51) Int. Cl.
G06F 9/445    (2006.01)
G06F 15/177   (2006.01)
G06F 15/16    (2006.01)

(52) U.S. Cl.
USPC .................................. 717/174; 713/2; 726/6

(58) Field of Classification Search
CPC ............... G06F 8/65; G06F 8/67; G06F 8/71
USPC .................................................. 717/168, 174
See application file for complete search history.

(56) References Cited

U.S. PATENT DOCUMENTS

| | | | |
|---|---|---|---|
| 5,999,740 A | 12/1999 | Rowley | |
| 6,711,557 B1 * | 3/2004 | Palaniappan | 706/45 |
| 7,287,259 B2 * | 10/2007 | Grier et al. | 719/331 |
| 7,664,834 B2 * | 2/2010 | Keith, Jr. | 709/220 |
| 7,810,089 B2 | 10/2010 | Sundarrajan et al. | |
| 2004/0003266 A1 | 1/2004 | Moshir et al. | |
| 2004/0010786 A1 * | 1/2004 | Cool et al. | 717/170 |
| 2004/0139175 A1 * | 7/2004 | Lin | 709/220 |
| 2005/0229240 A1 * | 10/2005 | Nanba | 726/6 |
| 2006/0075001 A1 * | 4/2006 | Canning et al. | 707/203 |
| 2006/0086785 A1 | 4/2006 | Sakata | |
| 2006/0218541 A1 * | 9/2006 | Saito | 717/146 |
| 2007/0006216 A1 * | 1/2007 | Nakane et al. | 717/173 |
| 2008/0046371 A1 * | 2/2008 | He et al. | 705/51 |
| 2008/0177994 A1 * | 7/2008 | Mayer | 713/2 |
| 2010/0242037 A1 | 9/2010 | Xie et al. | |
| 2011/0289499 A1 * | 11/2011 | Haubold et al. | 717/173 |
| 2012/0137278 A1 * | 5/2012 | Draper et al. | 717/170 |

OTHER PUBLICATIONS

"Installing Drivers and Utilities without Rebooting", Retrieved at <<http://msdn.microsoft.com/en-us/windows/hardware/gg566939>>, Dec. 4, 2001, pp. 4.
"Authoring a Single Package for Per-User or Per-Machine Installation Context in Windows 7", Retrieved at <http://blogs.msdn.com/b/windows_installer_team/archive/2009/09/02/authoring-a-single-package-for-per-user-or-per-machine-installation-context-in-windows-7.aspx>>, Sep. 2, 2009, pp. 3.

(Continued)

*Primary Examiner* — Don Wong
*Assistant Examiner* — Mohammad Kabir
(74) *Attorney, Agent, or Firm* — Bryan Webster; Andrew Sanders; Micky Minhas

(57) ABSTRACT

In one embodiment, an application updater may cleanly update a computer application 112 without causing a fault or a reboot of either the system or the process. A processor 220 may execute a predecessor version 508 of a computer application 112. The processor 220 may install a successor version 512 of the computer application 112 on a user account level. The processor 220 may execute the successor version 512 of the computer application 112.

20 Claims, 6 Drawing Sheets

(56) References Cited

OTHER PUBLICATIONS

"Getting Started with User Account Control on Windows Vista", Retrieved at <<http://technet.microsoft.com/en-us/library/cc507861.aspx>>, Retrieved Date: Nov. 28, 2011, pp. 16.

"Techniques for Efficient File Operations", U.S. Appl. No. 13/230,308, filed Sep. 12, 2011, pp. 29.

"International Search Report", Mail Date: Apr. 12, 2013, Application No. PCT/US2013/020519, Filed date: Jan. 7, 2013, pp. 9.

* cited by examiner

100

300

INSTALLATION ENGINE AND PACKAGE FORMAT FOR PARALLELIZABLE, RELIABLE INSTALLATIONS

BACKGROUND

A software developer may continually upgrade a computer program on a user device. The user device may contact a server administered by the software developer to see if upgrades are available. If an upgrade is available, the user device may download the new sections of software and add those sections to the existing program currently installed on the user device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to cleanly updating a computer application without causing a fault or a reboot of either the system or the process. A processor may execute a predecessor version of a computer application. The processor may install a successor version of the computer application on a user account level. The processor may execute the successor version of the computer application.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an application updater for a computing device.

A computer device may maintain a user account for each user of a computer device. The user account may protect certain data files from access by other users of the computer device. An application updater may update a computer application on a per-user basis in addition to a traditional per-machine basis. The per-user basis may update the computer application for a user account, rather than the other user accounts on the machine. A user account may elevate a user privilege of the user account to install on a machine level.

Each time the application updater runs, the application updater may extract the update in a new directory and data storage location, thus eliminating any file-in-use problems causing a reboot of the machine. Further, different versions of the computer application may be installed side-by-side without interfering with other versions of the computer application previously installed on the machine, allowing the computer application to update silently, without causing any issues to the smooth performance of the computer application. The application updater may install the same version or a newer version of the computer application as part of an install, reinstall, or repair of the computer application without interfering with the current version. If the available version is an older version, the application updater may execute a null operation to prevent downgrading the computer application. The application updater may install multiple computer applications in parallel.

Thus, in one embodiment, an application updater may cleanly update a computer application without causing a fault or a reboot of either the system or the process. A processor may execute a predecessor version of a computer application. The processor may install a successor version of the computer application on a user account level. The processor may execute the successor version of the computer application.

Figure 1:
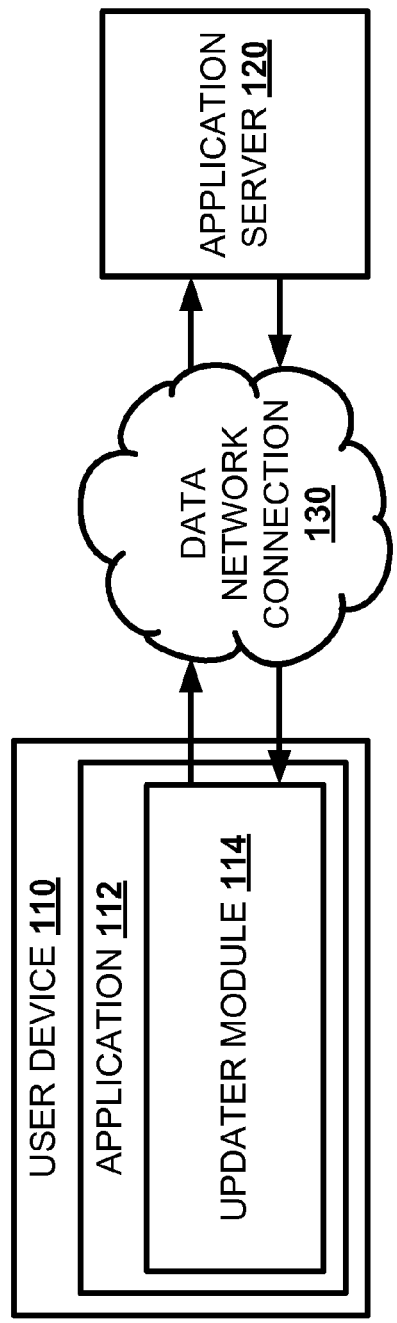
FIG. 1 illustrates, in a block diagram, one embodiment of a computer network.

FIG. 1 illustrates, in a block diagram, one embodiment of a computer network 100. A user device 110 may be a desktop computer, a laptop computer, a tablet computer, a handheld computer, or other computing device. The user device 110 may run a computer application 112. The computer application 112 may be any software program or firmware program executed by the user device 110. The computer application 112 may have a version indicating the iteration of the computer application 112. The computer application 112 may have an updater module 114 that connects to an application server 120 via a data network connection 130. The data network connection 130 may be a local area network connection, an internet connection, a mobile network connection, or other network connection. The updater module 114 may query the application server 120 to see if a new version of the computer application 112 is available. A predecessor version is the version of the computer application 112 currently being executed on the user device. A successor version is the new version of the computer application 112. The updater module 114 may download the successor version to replace the predecessor version.

Figure 2:
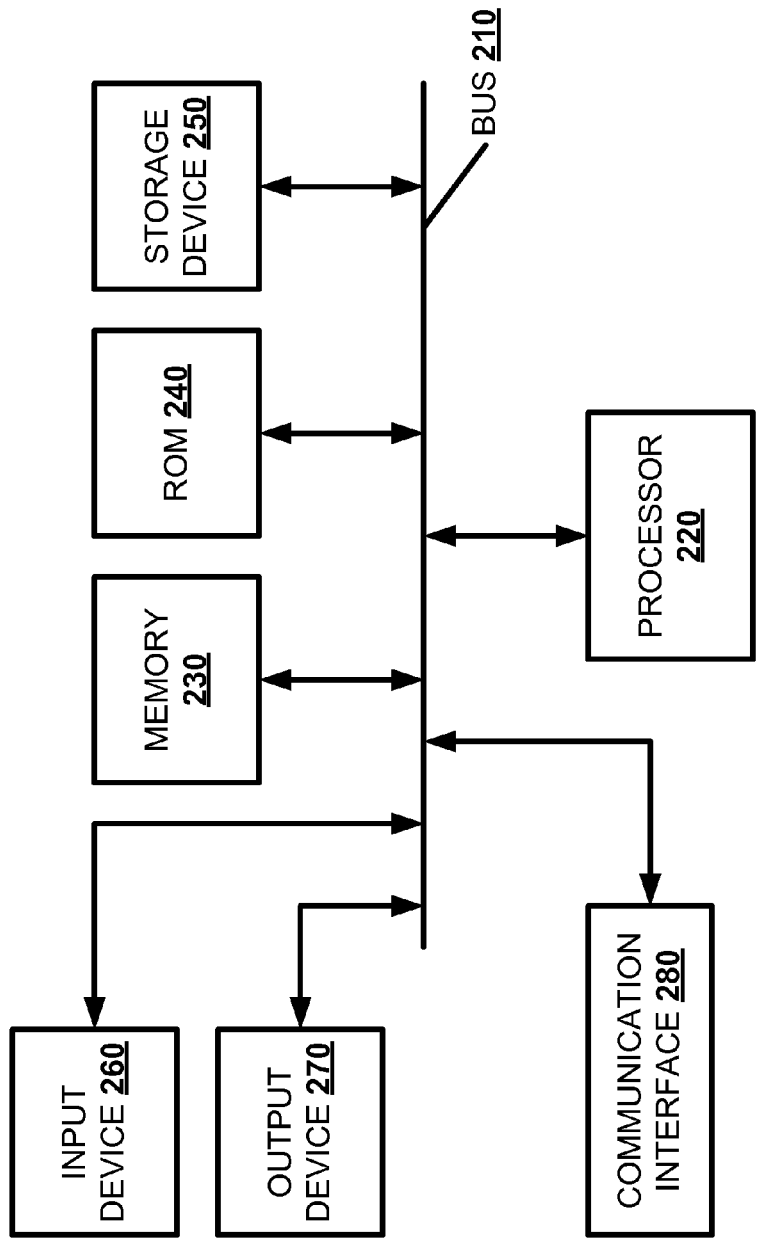
FIG. 2 illustrates, in a block diagram, one embodiment of a computing device.

FIG. 2 illustrates a block diagram of an exemplary computing device 200 which may act as an application updater. The computing device 200 may combine one or more of hardware, software, firmware, and system-on-a-chip technology to implement an application updater. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. A tangible machine-readable medium is a physical medium storing machine-readable code or instructions, as opposed to a transitory medium or signal. The storage device 250 may store a set of instructions detailing a method that when executed by one or more processors cause the one or more processors to perform the method.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3:
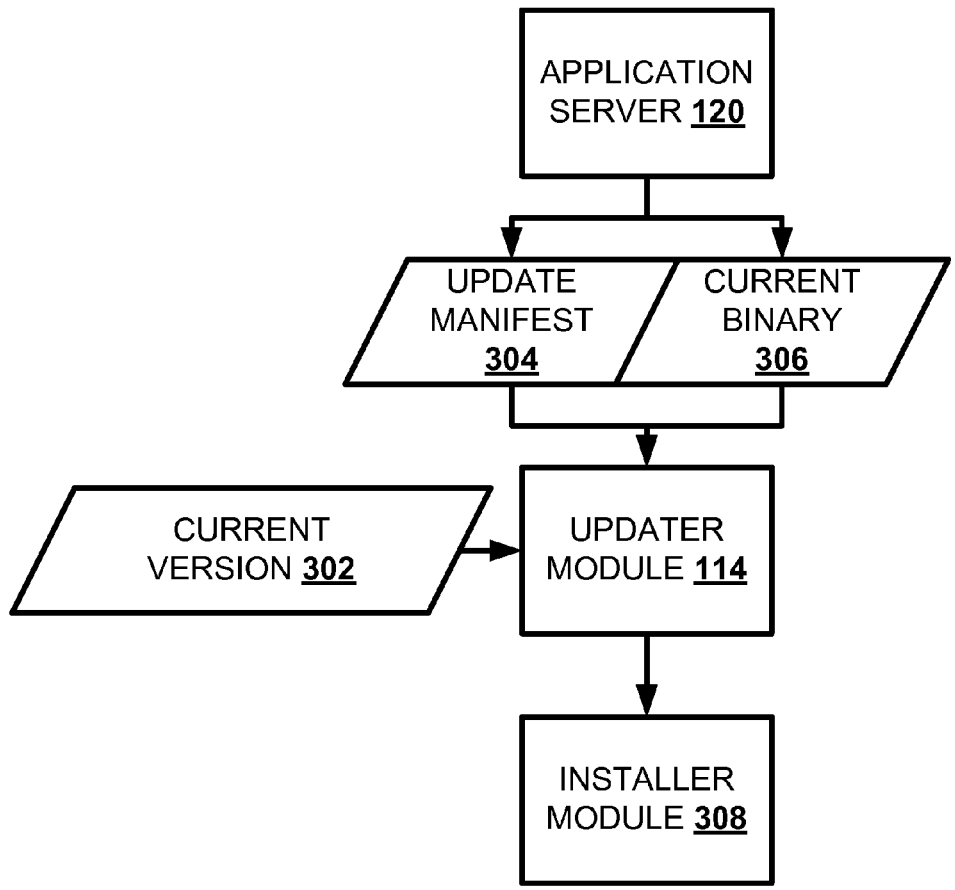
FIG. 3 illustrates, in a data flow diagram, one embodiment of an update service.

FIG. 3 illustrates, in a data flow diagram, one embodiment of an update service 300 for a computer application 112. Upon initiation, the current version 302 of the computer application 112 may direct an updater module 114 to request any updates from an application server 120. The application server 120 may send an update package to the updater module 114. The update package may have an update manifest 304 and a current binary 306 of the computer application 112. The update manifest 304 is a list of the files that get installed. The update manifest 304 may describe a file path, a file size, any registry keys, and any error checking mechanisms for each file. The update manifest 304 may be in an extensible markup language (XML) format. The current binary 306 is an executable file or associated file, such as a digital link library, for the computer application 112. The updater module 114 may use the update package to create the installer module 308 for installation.

Figure 4:
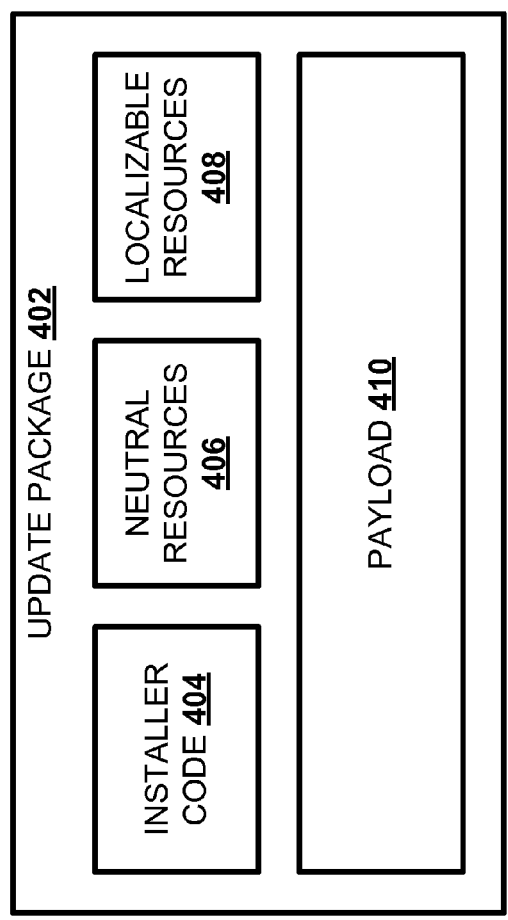
FIG. 4 illustrates, in a block diagram, one embodiment of an update for a computer application.

FIG. 4 illustrates, in a block diagram, one embodiment of an update 400 for a computer application. An update package 402 sent from an application server 120 may have an installer code 404, a set of neutral resources 406, a set of localizable resources 408, and a payload 410. The installer code 404 instantiates the installer module 308 on the user device 110. The set of neutral resources 406 is a set of general resources used during installation, such as icons, non-localizable strings, and non-localizable images to be shown during installation. The set of localizable resources 408 is a set of language specific resources used during installation, such as messages, prompts, and sounds. The payload 410 may be the update manifest 304 and the current binary 306.

Figure 5:
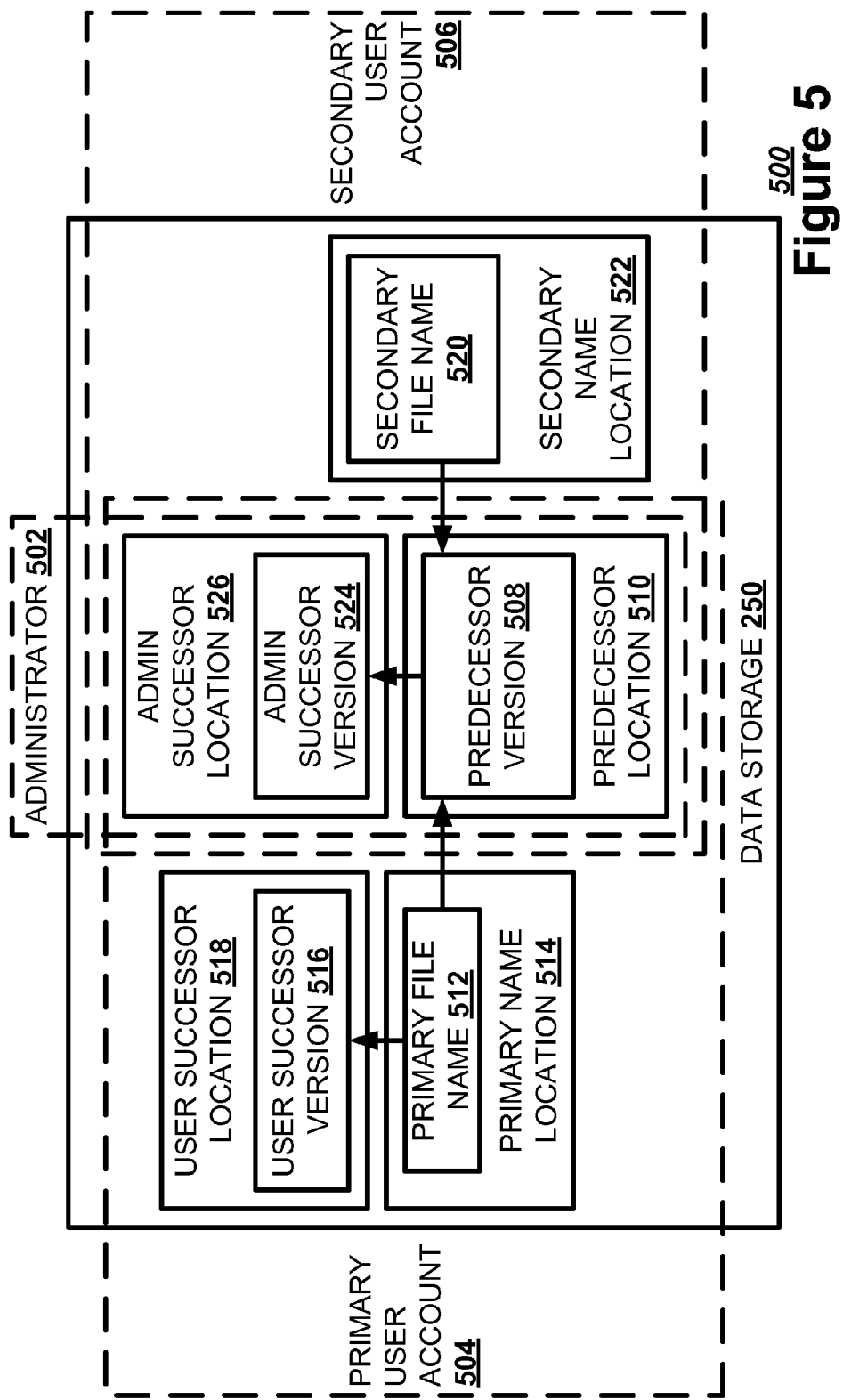
FIG. 5 illustrates, in a block diagram, one embodiment of a data storage layout.

FIG. 5 illustrates, in a block diagram, one embodiment of a data storage layout 500. A user device 100 may support multiple user accounts for multiple users. A user account may be password protected from other users. The data storage device 250 may store multiple application profiles for multiple users. A first user may update a computer application 112 while a second user may forgo the update. An administrator 502 may update the computer application 112 for each user account. A primary user account 504 is the user account that is executing the update of the computer application. A secondary user account 506 is a user account that is not actively executing an update of the computer application. The secondary user account 506 may be active or dormant.

The data storage 250 may store a predecessor version 508 of a computer application 112 in a predecessor location 510. A primary user account 504 may store a primary file name 512 in a primary name data storage location 514 referencing the predecessor version 508. A file name is a hard link to a data file. The primary file name 512 may be a hard link to the predecessor version 508. The predecessor version 508 may be immutable unless changed by the administrator account 502. The primary user account 504 may install a user successor version 516 of the computer application 112 on a user account level. A user account level installation installs a user successor version 516 for the primary user account 504 but forgoes any update to a secondary user account 506. The primary user account 504 may place the user successor version 516 in a clean user successor data storage location 518. A clean data storage location does not currently have a version of the computer application 112 stored at that location. A data storage location may be considered clean even if a version of the computer application 112 was present at the data storage location and then conventionally erased, such as through deregistering. The user successor version 516 may be a complete successor version of the computer application 112. A complete successor version is a successor version that has not been compared with the predecessor version and not had any overlapping sections removed. The primary file name 512 may be overwritten to be a hard link to the user successor version 516.

A secondary user account 506 may store a secondary file name 520 of the computer application 112 at a secondary name data storage location 522. The secondary file name 520 may be a hard link to the predecessor version 508. The secondary file name 520 may maintain the hard link to the predecessor version 508 even as the primary file name 512 becomes a hard link to the user successor version 516.

An administrator account 502 may replace the predecessor version 508 with an administrator successor version 524 of the computer application 112 on a machine level. The administrator account 502 may place the administrator successor version 524 in a clean administrator successor data storage location 524. The operating system may elevate a user status for a user account to an administrative privilege to make updates at a machine level. Updates on a machine level install a successor version to each user account on the user device 110. The administrator account 502 may reset the primary file name 512 and the secondary file name 520 to be hard links to the administrator successor version 524.

Figure 6:
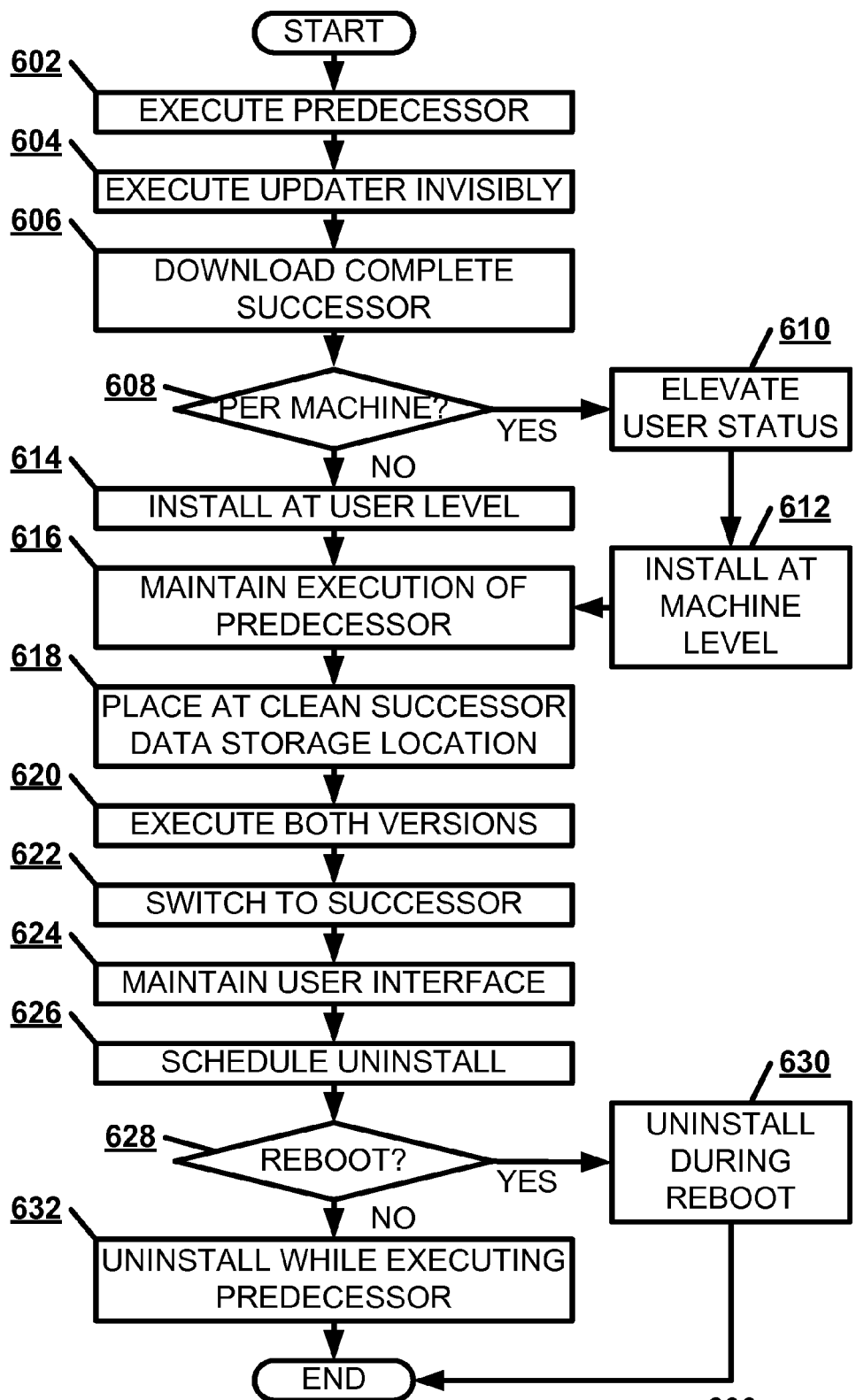
FIG. 6 illustrates, in a flowchart, one embodiment of a method for upgrading a computer application.

FIG. 6 illustrates, in a flowchart, one embodiment of a method 600 for upgrading a computer application 112. The application updater may execute a predecessor version 508 of a computer application 112 (Block 602). The application updater may execute an updater module 114 invisibly to a user (Block 604). The application updater may download a complete successor version 516 using the updater module 114 disregarding the predecessor version 508 (Block 606). If the installation is on a per machine basis (Block 608), the application updater may elevate the user status to an administrative privilege (Block 610). The application updater may install the complete successor version 524 of the computer application 112 on a machine level (Block 612). If the installation is on a per user basis (Block 608), the application updater may install a complete successor version 516 of the computer application on a user account level (Block 614). The application updater may maintain execution of the predecessor version 508 while installation of the complete successor version 516 occurs (Block 616). The application updater may place the complete successor version 516 in a clean successor data storage location 514 (Block 618). The application updater may execute the predecessor version 508 and the complete successor version 516 of the computer application 112 simultaneously (Block 620). The application updater may execute a switch from the predecessor version 508 to the complete successor version 516 (Block 622). The application updater may maintain a presentation of a user interface of the computer application 112 during the switch (Block 624). The application updater may schedule the predecessor version 508 for an uninstall operation (Block 626). If the uninstall operation is scheduled during a system reboot (Block 628), the application updater may uninstall predecessor version 508 during the system reboot (Block 630). Otherwise, the application updater may uninstall the predecessor version 508 while executing the complete successor version 516 (Block 632).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
executing a predecessor version of a computer application in a primary user account of a computer device;
installing a successor version of the computer application for the primary user account; and
executing the successor version of the computer application in the primary user account while a secondary user account of the computer device has the predecessor version.

2. The method of claim 1, further comprising:
downloading a complete successor version using an updater module.

3. The method of claim 2, further comprising:
executing the updater module invisibly to a user.

4. The method of claim 1, further comprising:
placing the successor version in a clean successor data storage location.

5. The method of claim 1, further comprising:
maintaining execution of the predecessor version while installation of the successor version occurs.

6. The method of claim 1, further comprising:
executing a switch from the predecessor version to the successor version.

7. The method of claim 6, further comprising:
maintaining a presentation of a user interface of the computer application during the switch.

8. The method of claim 1, further comprising:
executing the predecessor version and the successor version simultaneously.

9. The method of claim 1, further comprising:
uninstalling the predecessor version while executing the successor version.

10. A tangible machine-readable medium having a set of instructions detailing a method stored thereon that when executed by one or more processors cause the one or more processors to perform the method, the method comprising:
executing a predecessor version of a computer application referenced by a primary file name of a primary user account of a computer device;
downloading a complete successor version using an updater module disregarding the predecessor version;
installing the complete successor version of the computer application referenced by the primary file name in a clean successor data storage location.

11. The tangible machine-readable medium of claim 10, wherein the method further comprises:

installing the complete successor version of the computer application on a machine level.

12. The tangible machine-readable medium of claim 11, wherein the method further comprises:
   elevating a user status to an administrative privilege.

13. The tangible machine-readable medium of claim 10, wherein the method further comprises:
   installing the complete successor version of the computer application on a user account level.

14. The tangible machine-readable medium of claim 10, wherein the method further comprises:
   executing the updater module invisibly to a user.

15. The tangible machine-readable medium of claim 10, wherein the method further comprises:
   resetting the primary file name to be a hard link to an administrator successor version.

16. The tangible machine-readable medium of claim 15, wherein the method further comprises:
   maintaining a presentation of a user interface during the switch.

17. The tangible machine-readable medium of claim 10, wherein the method further comprises:
   executing the predecessor version and the complete successor version simultaneously.

18. The tangible machine-readable medium of claim 10, wherein the method further comprises:
   scheduling the predecessor version for an uninstall operation during a system reboot.

19. An application updater, comprising:
   a communications interface that downloads a complete successor version of a computer application;
   a data storage that stores a predecessor version of the computer application in a predecessor data storage location and the complete successor version in a clean successor data storage location; and
   a processor that executes the predecessor version and installs the complete successor version of the computer application in a primary user account while a secondary user account has the predecessor version.

20. The application updater of claim 19, wherein the processor maintains execution of the predecessor version while installation of the complete successor version occurs.

* * * * *